United States Patent [19]

Nishikawa et al.

[11] Patent Number: 4,633,732

[45] Date of Patent: Jan. 6, 1987

[54] SHAFT AND BUSH DEVICE AND TILTING STEERING EQUIPMENT WITH THE SHAFT AND BUSH DEVICE

[75] Inventors: Masumi Nishikawa, Toyoake; Masanobu Ishikawa, Nagoya; Hiroki Sato, Aichi; Shuhei Toyoda, Toyota; Hakumi Ishii, Okazaki, all of Japan

[73] Assignees: Aisin Seiki Kabushiki Kaisha, Kariya; Toyota Jidosha Kabushiki Kaisha, Toyota, both of Japan

[21] Appl. No.: 619,269

[22] Filed: Jun. 11, 1984

[30] Foreign Application Priority Data

Jun. 11, 1983 [JP] Japan ................. 58-104829
Jun. 11, 1983 [JP] Japan ................. 58-104830
Jun. 13, 1983 [JP] Japan ................. 58-90070[U]

[51] Int. Cl.$^4$ ................. B62D 1/18; F16H 25/22
[52] U.S. Cl. ................. 74/493; 74/424.8 A; 74/441; 280/775; 411/432
[58] Field of Search ................. 74/424.8 A, 441, 493; 280/775; 411/432, 433; 403/366, 369, 371

[56] References Cited

U.S. PATENT DOCUMENTS

| | | | |
|---|---|---|---|
| 582,074 | 5/1897 | Melhuish | 74/411 |
| 2,533,608 | 12/1950 | Newman | 74/424.8 A X |
| 2,882,781 | 4/1959 | Gates | 411/432 |
| 3,170,337 | 2/1965 | Linley | 74/424.8 |
| 3,252,350 | 5/1966 | Zeigler | 74/493 |
| 3,977,262 | 8/1976 | Randolph | 74/424.8 R X |
| 4,176,561 | 12/1979 | Davidson | 74/424.8 A |

FOREIGN PATENT DOCUMENTS

| | | | |
|---|---|---|---|
| 405217 | 8/1923 | Fed. Rep. of Germany | 74/441 |
| 715919 | 1/1942 | Fed. Rep. of Germany | |
| 47-2574 | 12/1967 | Japan | 74/424.8 A |
| 57-110851 | 7/1982 | Japan | 74/441 |
| 57-179463 | 11/1982 | Japan | |
| 58-33570 | 2/1983 | Japan | 74/493 |
| 210574 | 11/1968 | U.S.S.R. | 411/433 |

Primary Examiner—Allan D. Herrmann
Attorney, Agent, or Firm—Oblon, Fisher, Spivak, McClelland & Maier

[57] ABSTRACT

The shaft and bush device includes a shaft, a bush having a slit in its axial direction and a pressing member which forces the bush inwardly to contact with the shaft so that the bush and shaft are pressed to each other without any clearance. The shaft and the bush may be a screw shaft and a nut engaging the screw shaft or a pin and a nut engaging the pin.

A tilting steering apparatus has this shaft and bush device. Namely the device is used as a pivot pin connecting an upper bracket rotatably holding an upper steering shaft and main bracket fixed to a body of an automobile. The device is also used for an expansion-shrinking device which swings the upper bracket against the main bracket. The expansion-shrinking device has a screw shaft and nut which form the shaft and bush device.

5 Claims, 14 Drawing Figures

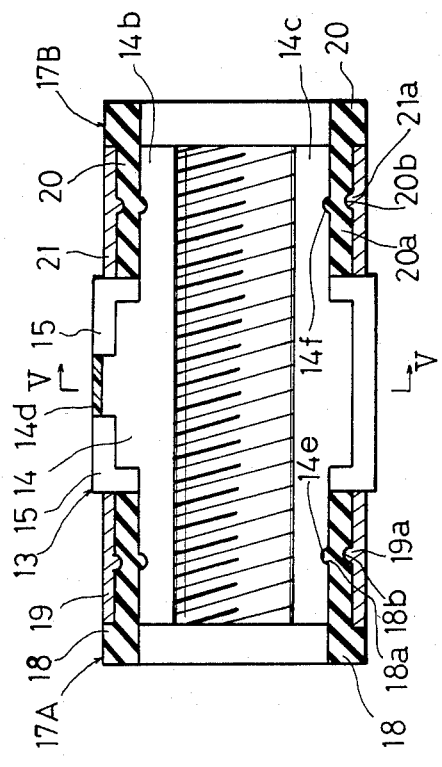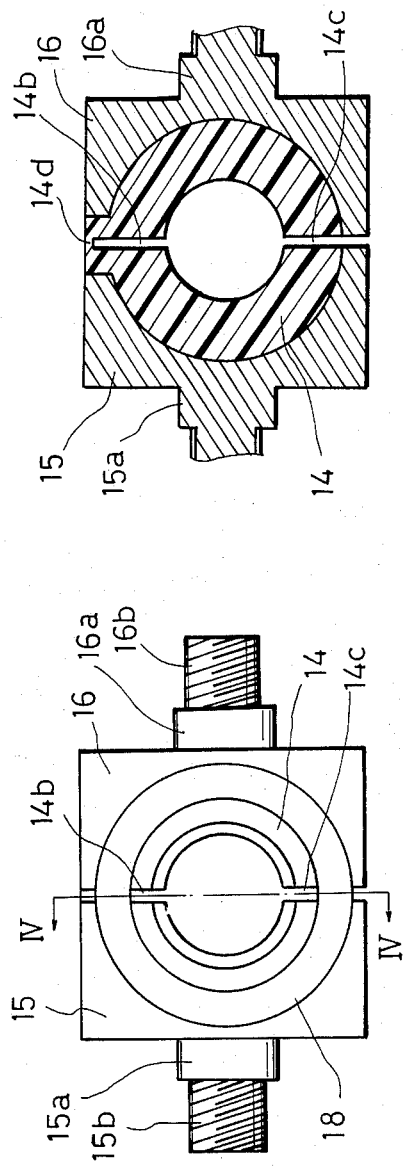

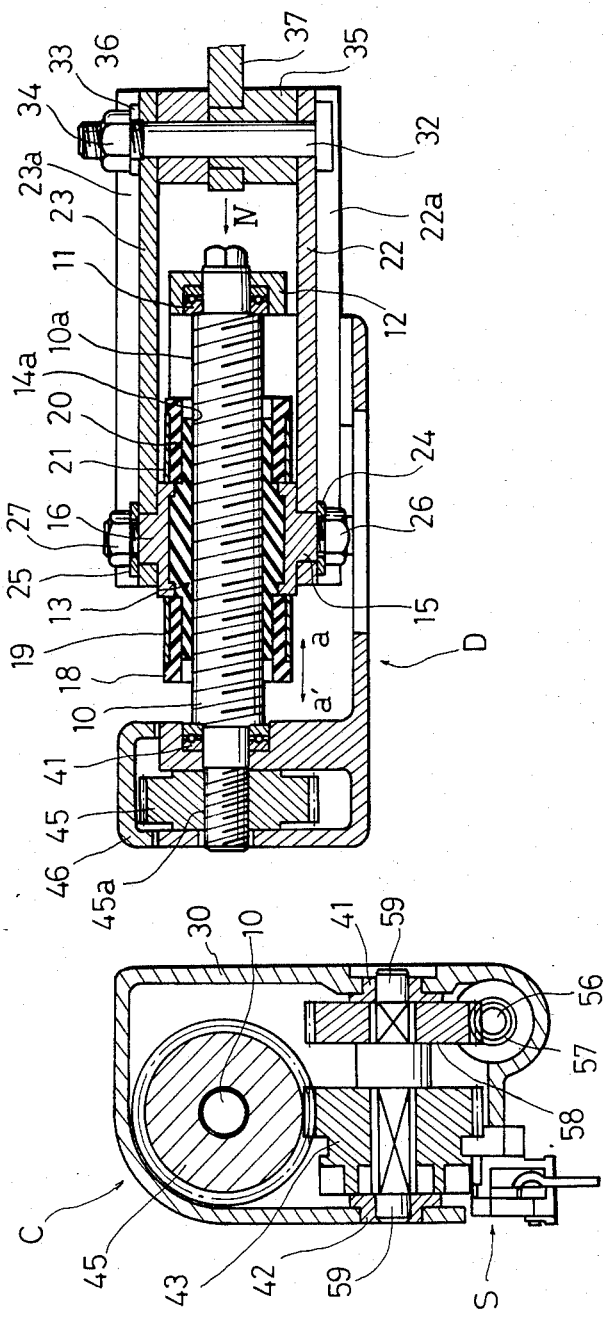

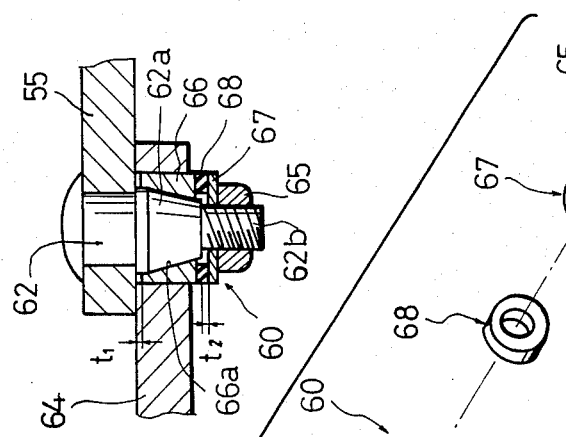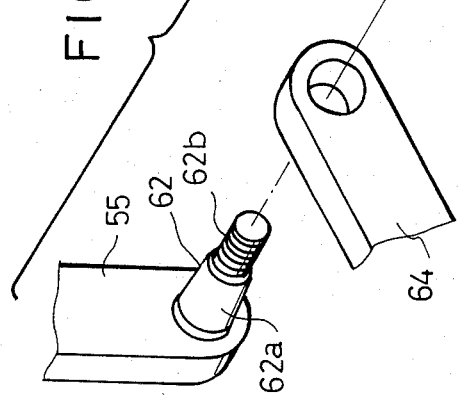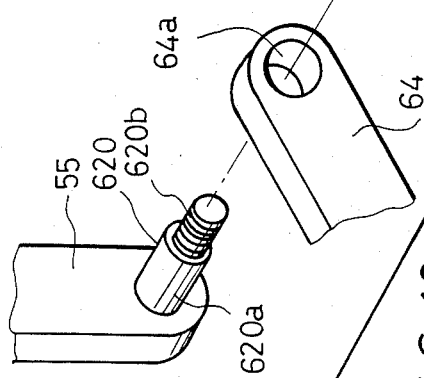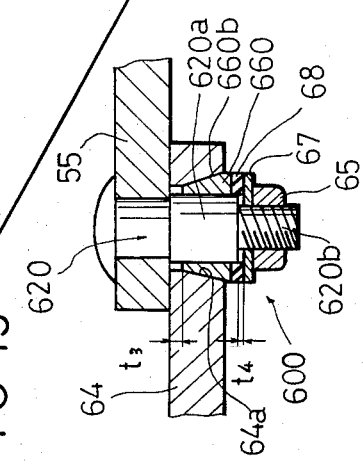

SHAFT AND BUSH DEVICE AND TILTING STEERING EQUIPMENT WITH THE SHAFT AND BUSH DEVICE

BACKGROUND OF THE INVENTION

1. Field of the Invention

This invention relates to a shaft and bush device and particularly to a tilting steering equipment which prevents backlash between a shaft and a bush.

2. Description of the Prior Art

Generally, a certain backlash is caused between a male screw and a female screw, because of the fabricating errors. Also a backlash is caused in bearings such as a rotational bearing or a reduction gear mechanism used for an automotive tilting steering equipment.

Therefore, the conventional tilting steering equipment has disadvantages in that the accuracy and smoothness of the tilting operation is not enough, and the operational stability is not sufficient such that the driver may feel uncomfortable.

SUMMARY OF THE INVENTION

Therefore, the present invention has been completed in order to solve the above mentioned problems.

Accordingly, the primary object of the present invention is to provide a shaft and bush device which prevents backlash therebetween.

Another object of the present invention is to provide a tilting steering equipment which can offer an accurate tilt angle of the steering wheel.

A further object of the present invention is to provide a tilting steering equipment which has a rotational bearing to prevent backlash at the bearing portion.

BRIEF DESCRIPTION OT THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross sectional view of a first embodiment of a shaft and bush device according to the present invention, which shows an enlarged portion of FIG. 2, FIG. 2 is a vertical cross sectional view showing a device which changes rotational motion to linear motion, FIG. 3 is a side view of the device, of which a shaft 10 is taken out, shown from the direction of arrow III in FIG. 2, FIG. 4 is a cross sectional view taken along the line IV—IV of FIG. 3, FIG. 5 is a cross sectional view taken along the line V—V of FIG. 4, FIG. 6 is an exploded view showing some parts shown in FIG. 2, FIG. 7 is a side view showing the whole tilting steering equipment according to a second embodiment of the present invention, FIG. 8 is a cross sectional view taken along line VIII—VIII of FIG. 7, FIG. 9 is a cross sectional view taken along line IX—IX of FIG. 7, FIG. 10 is a side view of the whole tilting steering equipment according to a third embodiment of the present invention, FIG. 11 is a cross sectional view taken along the line XI—XI of FIG. 10, FIG. 12 is an exploded view showing the parts of FIG. 11, FIG. 13 is a cross sectional view similar to FIG. 11, but showing one variation of the third embodiment, and FIG. 14 is an exploded view showing the parts of FIG. 13.

DETAILED DESCRIPTION OF THE INVENTION

Figure 1:
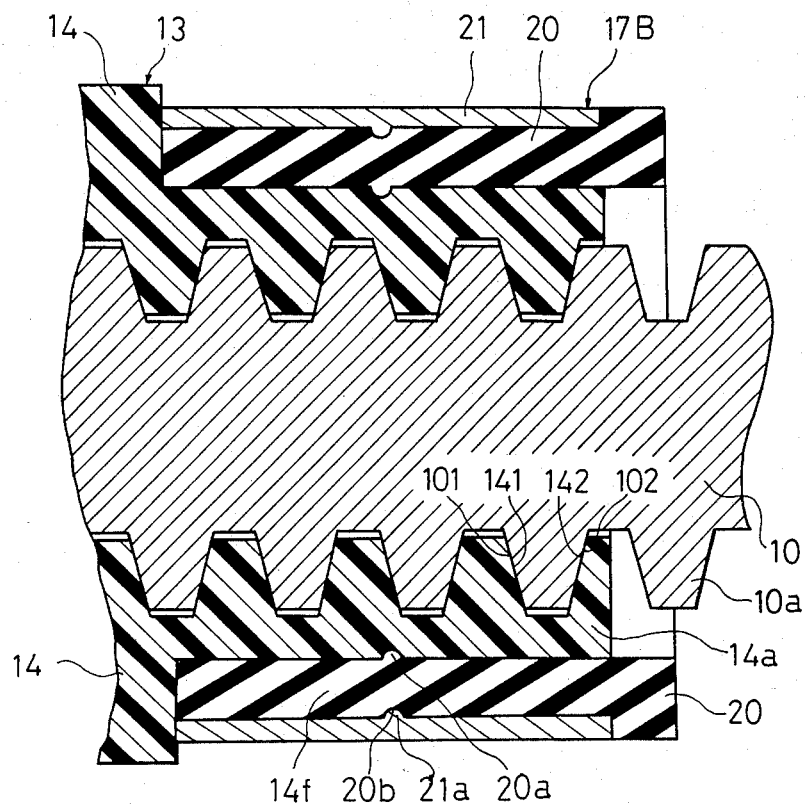

A shaft and bush device according to the present invention comprising; a shaft (a male member), a bush (female member) which engages the shaft and a pressing means for pressing the bush to the shaft in the radial direction thereof. In either of the shaft or the bush, at least one slit or opening is formed along the axis thereof so that either one is composed of at least two parts. In the case that the bush is composed of two or more parts, the pressing means may be placed at the outside of the bush for pressing radially each of the parts forming the bush toward the shaft. In case the shaft is composed of two or more parts, the pressing means may be placed at the inner center of the shaft for pressing each of the parts forming the screw shaft in the centrifugal direction. Thus the contact between the shaft and the bush is intensified. The shaft may be a screw shaft and the bush may be a nut or the shaft may be a engaging pin and the bush may be a bearing.

One of the tilting steering mechanism of the present invention includes the shaft and bush device mentioned above. The tilting mechanism has an upper bracket which supports an upper steering shaft rotatably. The upper bracket is swingably supported by a main bracket. A linear expansion device is disposed between one end of the upper bracket and the main bracket. The expansion device is provided with the aforesaid shaft and bush device and the expansion device is expanded or contracted by rotation of the shaft. The upper bracket is thereby moved rocking with respect to the main bracket so that the upper steering shaft is tilted.

Another tilting steering equipment of the present invention includes the shaft and bush device mentioned above disposed between an upper bracket and a main bracket. The shaft and bush device includes a pin fixed to one of the brackets a bush engaging the pin and being inserted into an axial hole of the other bracket. Both brackets rotate with respect to each other through the bush. At least either of the axial hole or the outer circumference of the pin is tapered, and the bush has a corresponding inner surface to the outer circumference of the pin and a correspondingg outer surface to the inner surface of the axial hole. Namely one of the inner and outer surfaces of the bush is tapered. The bush has at least one slit in the axial direction so that the bush can expand or shrink radially. The device includes further a pressing member to press the bush constantly directly or indirectly toward the pin.

The pressing member preferably composed of an elastic rubber ring with a washer for pressing the side surface of the bush. The bush forced to move axially by the pressure of the pressing member is squeezed between the inner surface of the axial hole and the outer circumference of the pin. The bush shrinks radially and contacts with the outer circumference of the pin without backlash. A spring or bellevile spring can be employed as the pressing member. The washer is not always necessary, and when the washer is used, it may be integrally formed with the elastic ring.

The preferred embodiment of the present invention will be described in the following accompanied with the drawings.

EMBODIMENT 1

The embodiment of a shaft and bush device according to the present invention will be explained referring to FIG. 1–FIG. 6.

Figure 2:
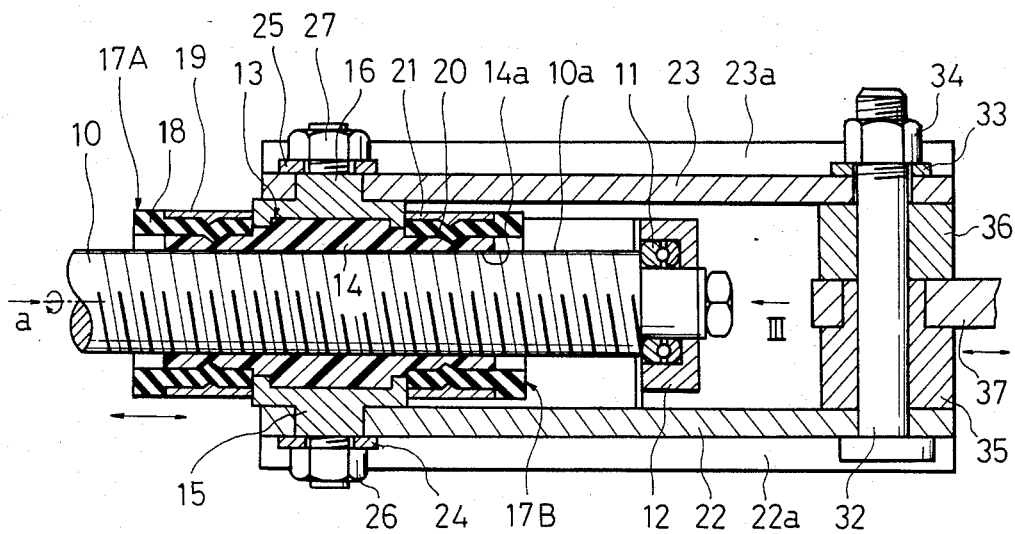

FIG. 1 is a cross sectional view of an enlarged portion of FIG. 2. The numeral 10 designates a screw shaft, both ends of which are supported by one end of a housing 12 through bearings 11 (FIG. 2 does not show the other end portion of the housing 12). The shaft 10 is rotated by a driving means (not shown). The male threads 10a of the shaft 10 interengage the female threads 14a of a nut 14 which is a part of a bush or nut member 13. The nut member 13 is composed of the nut 14 made of resin and supporting members 15, 16 made of metal. They are integrally molded and form the nut member 13. The screw shaft 10 is engaged into the nut 14. At each side of the supporting members 15 and 16, column shaped projections 15a, 16a are integrally shaped, and at the top thereof the male threads 15b, 16b are respectively formed shown in FIG. 3. The nut 14 contains slits 14b, 14c are elongated in the axial direction as shown in FIG. 3 and FIG. 5. The left half and the right half of the nut 14 are connected each other by an outer thin wall part 14d. The nut 14 is formed in such a shape that the screw shaft 10 is radially biased by such when the nut 14 is in the state as shown in FIG. 2.

The nut member 13 is provided with pressing means 17A, 17B on the outer circumferential surfaces of the both end portions of the nut 14. The pressing means 17A, 17B press both end portions of the nut 14 radially toward the center. Each of the pressing means 17A, 17B is composed of an annular pressing member 18 or 20 made of rubber and a metallic holder 19 or 21 which covers the outer circumferential surfaces of the annular pressing member 18 or 20.

As shown in FIG. 1 and FIG. 4, annular groove 14e, 14f are respectively formed on the outer cicumference of each of the both end portions of the nut 14. Annular projections 18a, 20a are formed on the inner circumference of each of the rubber pressing members 18, 20. The annular projections 18a, 20a engage the grooves 14e, 14f. These projections 18a, 20a and grooves 14e, 14f are formed in order to prevent the pressing members 18, 20 from falling off in an axial direction of the nut 14. For the same purpose, annular grooves 18b, 20b are formed on the outer circumference of the pressing members 18, 20, and annular projections 19a, 21a are formed on the inner circumference of the holders 19, 21 to engage the aforesaid grooves 18b, 20b.

Figure 6:
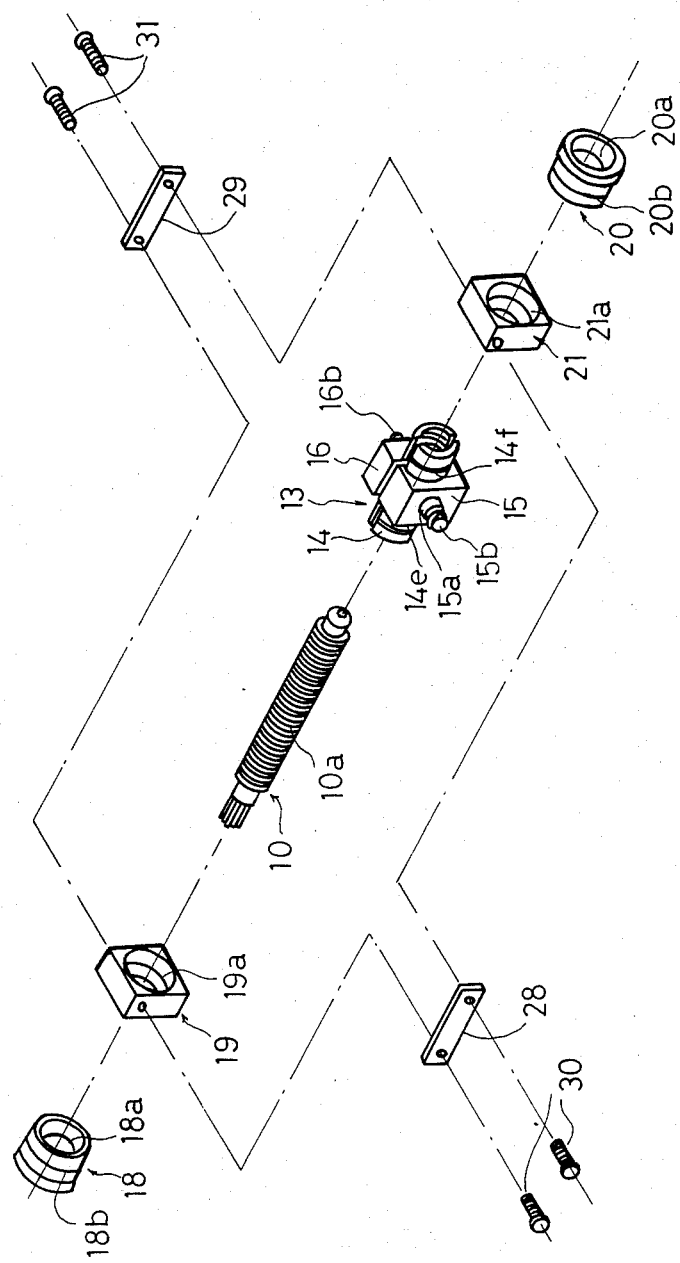

As shown in FIG. 6, the holders 19, 21 are coupled with each other by two plates 28, 29 and two bolts 30, 31 so as not to come off from each other.

As shown in FIG. 2, each end of two bars 22, 23 are engaged to each of the column shaped projections 15a, 16a of the supporting members 15, 16 respectively. Then each of the ends of the bars 22, 23 are fixed by means of nuts 26, 27 and the washers 24, 25. Numerals 22a, 23a designate bent portions of the bars 22, 23. The other end of the bars 22, 23 are respectively fixed to one end of a reciprocating member 37 by a bolt 32, a washer 33 and a nut 34 through boss members 35, 36.

The operation of the present embodiment will now be explained in the following discussion. In FIG. 2, rotational torque is transmitted to the screw shaft 10, whereby the screw shaft 10 is rotated around the axis thereof. The combined structure of nut member 13 and pressing members 17A, 17B are then moved axially with respect to the shaft 10. Following this movement of the nut member 13, both bars 22, 23, the boss members 35, 36 and the reciprocating member 37 are moved with respect to the shaft 10. Consquently, rotational motion of the screw shaft 10 is transfered to linear motion of the reciprocating member 37.

In this embodiment, if both ends of each of the bars 22, 23 are rotatably connected to the supporting members 15, 16 and the bolt 32, and if the bolt 32 is settled except on the axis of the screw shaft 10, then both bars 22, 23 will be moved around the bolt 32 by rotation of the shaft 10. Also if the bolt 32 is not fixed but the other end (not shown) of the reciprocating member 37 is pivoted to another axis (not shown), the reciprocating member 37 will move around the axis.

Next, the engaging state between the screw shaft 10 and the nut 14 is explained with reference to FIG. 1. The nut 14 of the present embodiment is made of resin, which is provided with the slits 14b, 14c. The holders 19, 21 made of metal radially push the nut 14 inwardly to the center direction thereof from the outer circumference through the annular pressing members 18, 20 made of rubber which are more elastic than the resin.

Thus the female threads 14a of the nut are pressed to the male threads 10a of the screw shaft 10, and in any operating condition, no backlash occurs between the surface 101 of the male screw thread 10a and the surface 141 of the female screw thread 14a which are always in contact with each other. Additionally, the nut 14 is made of resin so that it can advantageously prevent the noise and abrasion. In the above explained embodiment, the nut 14 is provided with the slits 14b, 14c formed along the axial direction thereof, and the both half parts thereof are coupled through the thin portion 14d in order to improve the engagement of the nut. However, without the thin portion, the both half parts may be completely divided. In this case, a little opening (slit) should remain between both half parts when the nut is engaged. The nut should be constructed to be constantly pressed to the screw shaft by means of the pressing members at the outer circumference.

In the present embodiment, the nut has the slits and the pressing members pushing the nut radially from the outer circumference to the screw shaft. Conversely, it may be constructed such that a slit is formed on a screw shaft, namely the screw shaft is divided into at least two parts and a pressing member is disposed inside of the shaft and pushes outwardly the both parts of the screw shaft in the radial direction of the shaft to be pressed to a screw shaft constantly.

Though the nut is made of resin in this embodiment, the nut may be made of metal and the screw shaft may be made of resin. The pressing members 18, 20 are made of rubber material in the present embodiment. However, other elastic materials or elastic parts such as spring may be employed for such members.

EMBODIMENT 2

Figure 7:
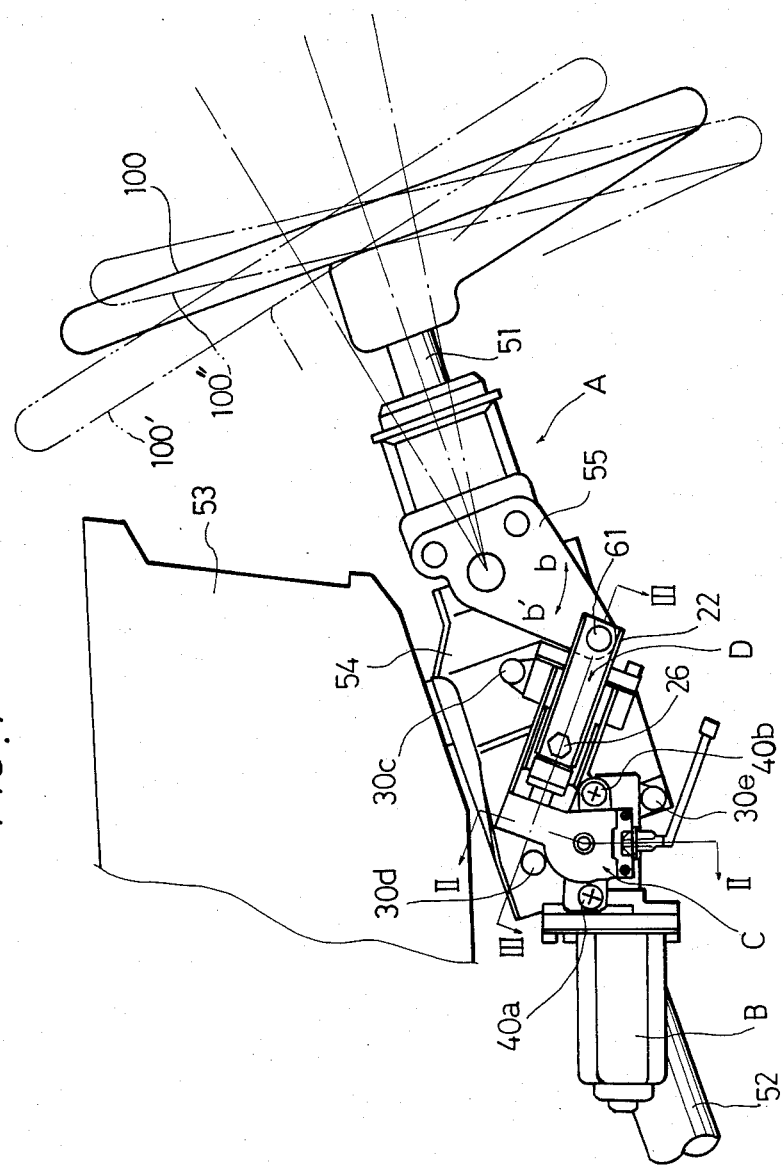

The second embodiment will be explained referring to FIG. 7–FIG. 9, showing the tilting steering equipment of this embodiment.

FIG. 7 shows a tilting steering equipment A according to the present embodiment, which adjusts the angle of an upper main shaft 51 and a lower main shaft (not shown). The upper main shaft 51 is combined with a steering wheel 100, and the lower main shaft is disposed rotatably within a column tube 52 through bearings (not shown).

The present tilting steering mechanism A comprises; a main bracket 54 which is placed at the lower part of a body 13 which forms a dashboard, a driving source B connected to the main bracket 54, a reduction gear mechanism C connected to the driving source B, a shaft and bush device D connected to the reduction gear mechanism C and an upper bracket 55 which is pivoted to the main bracket 54 and moved swingly by the shaft and bush device D.

The driving source B is composed of such as an electric motor and operated by a remote control device (not shown). At the top of an output shaft 56 of the driving source B (shown in FIG. 8), a worm 57 is fixed, which engages a worm wheel 58 of the reduction gear mechanism C.

The reduction gear mechanism C serves for increasing the torque by reducing the rotating speed of the driving source B. The torque is transmitted from the reduction gear mechanism C to the shaft and bush device D. As shown in FIG. 8, the reduction gear mechanism C comprises a shaft 59 rotatably supported by both side walls of a housing 30 through bearings 41, 42, the aforesaid worm wheel 58 being fixed to one end portion of the shaft 59 and a gear 43 being fixed to the other side portion of the shaft 59. The gear 43 engages a gear 45 fixed to the end of a screw shaft 10.

As shown in FIG. 8, adjusted to the reduction gear mechanism C, is a sensor S mounted so as to detect the rotating angle of the gear 23 in the reduction gear mechanism C. The rotating angle of the gear 43 relates to the tilt angle of the upper main shaft 51. The shaft and bush device D serves for changing rotational motion to linear motion, which is constructed as shown in FIG. 9. The shaft and device D is the same as the device explained in EMBODIMENT 1. Namely, the screw shaft 10 is rotatably supported by one end 12 of a housing 30 through bearings 41, 11. The housing 30 is fixed to the main bracket 54 by bolts 30c, 30d, 30e (shown in FIG. 7). The gear 45 is rotated integrally with the screw shaft 10, wherein the gear 45 and the end of the screw shaft 10 is coupled by way of a spline joint as designated with the numeral 45a. A cover member 46 is attached to the housing 30. Here, more detailed explanation of the shaft and bush device D is omitted, except for member 37. The detailed explanation of the device D is described in EMBODIMENT 1 and shown in FIG. 2 to FIG. 5. In FIG. 2, numeral 37 designates a reciprocating member, but here numeral 37 designates one end portion of the upper bracket 55 shown in FIG. 7.

The operation of the present steering wheel equipment will be explained hereinafter.

When the steering wheel 100 is inclined to the portion designated with a broken line 100' in FIG. 7, the driving source B is actuated by tuning the switch (not shown) ON. Thus, the rotational motion of the driven source B is accomodated from the output shaft 56 (shown in FIG. 8) through the worm 57, the worm wheel 58, the gear 43 and the gear 45 to the screw shaft 10, and causes the shaft 10 to rotate axially at a low speed. Thus the combined members consisting of the nut member 13, the annular pressing members 18, 20, and the holders 19, 21 are transfered in an axial direction a of the shaft 10 (shown in FIG. 9). The bars 22, 23 follow this movement in the same direction so that the upper bracket 55 is swung in the direction b and the steering wheel 100 is tilted as shown by the broken line 100' in FIG. 7.

On the contrary, when the steering wheel 100 is to be moved as designated by a broken line 100", the driving source B is turned ON to rotate in the opposite direction. Thus, the bars 22, 23 is moved in the direction of a', whereby the upper bracket 37 is moved in the direction of b'. As detailed in EMBODIMENT 1, no backlash is caused between the screw-shaft 10 and the nut member 13 of the shaft and bush device D in the tilting steering equipment according to the present embodiment. The upper bracket 55 is supported by the body 53, without any looseness.

EMBODIMENT 3

Figure 10:
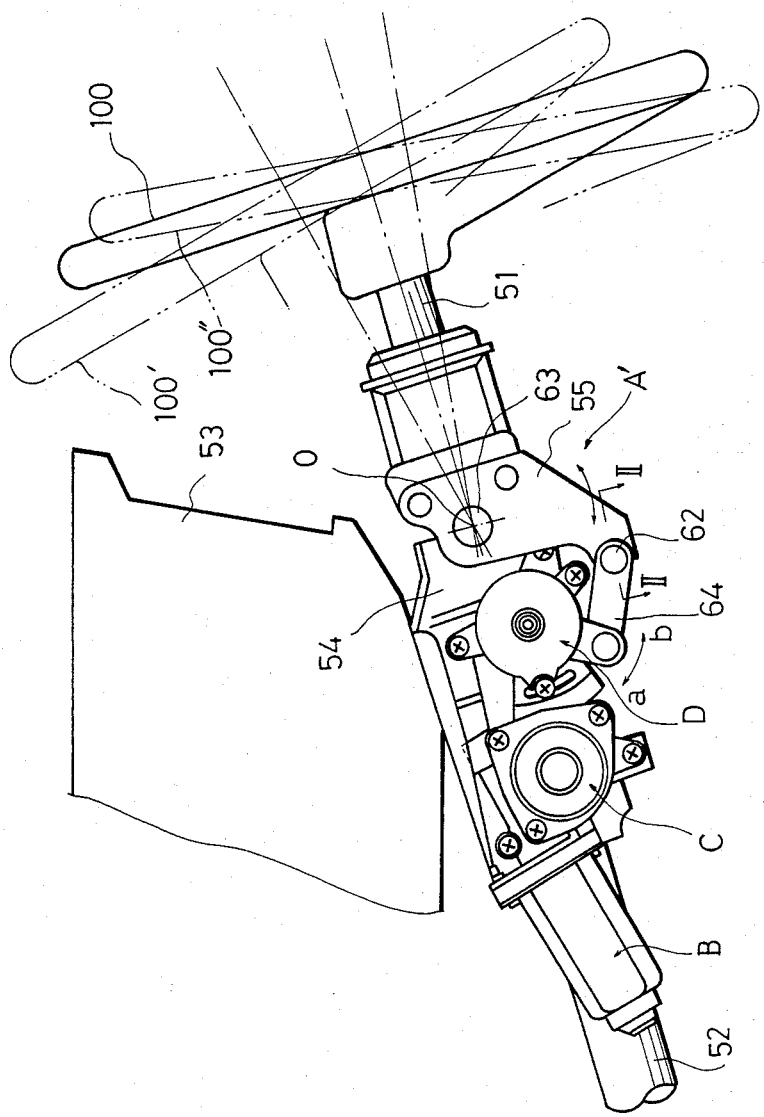

The third embodiment of the tilting steering equipment will be described referring to FIG. 10–FIG. 14. FIG. 10 shows a complete side view of the tilting steering equipment A' according to the present embodiment. The tilting steering equipment A' serves for adjusting the angle of an upper main shaft 51 to a lower main shaft (not shown) which is supported rotatablly by a bearing within a column tube 52. A steering wheel 100 is fixed to the upper end of the upper main shaft 11. The tilting steering equipment A' includes a main bracket 54, a driving source B fixed to the main bracket 54, a reduction gear mechanism C' fixed to the main bracket and interlocked with the driving source B, a spring coupler D fixed to the main bracket 54 and operated with the output shaft at the reduction gear mechanism C' and accomodating torque to a link 64, and an upper bracket 55 which is moved swingly around a pin 63 by the spring coupler D through the link 64. The pin 63 is fixed to the main bracket 54. The above mentioned driving source B, reduction gear mechanism C' and the spring coupler D are detailed in a pending application of the present applicant, which is Japanese Patent Application No. 198344/1982.

FIG. 11 is a cross sectional view along with the line XI—XI of FIG. 10. Each axis of the link 64 and the upper bracket 55 are coupled through a shaft and bush device 60. The shaft and bush device 60 is composed of a pin 62 fixed to the upper bracket 55, a collar 66 disposed at the outer circumference of the tapered shaft 62a of the pin 62 and an elastic member 68 (made of rubber in the present embodiment) which is in contact with the outer end surface of the collar 66 and biased towards the collar 66 by a nut 65 and a washer 67. The nut 65 engages the male screw 62b formed at the top of the pin 62, thereby pressing the elastic member 68 toward the collar 66. Along the axis of the collar 66 are located a tapered hole 66a, a slit 66b and a ditch 66c shown in FIG. 12. The slit 66b and ditch 66c enable the collar 66 to bend so as to have a smaller radius when an external force is applied towards the center of the collar 66 from the outer circumference. The shaft and bush device 60 is constructed such that there is always a clearance t1 between the side surface of the collar 66 and the side surface of the upper bracket 55, and such that there is always a clearance t2 between the shoulder of the tapered shaft 62a and the washer 67 as shown in FIG. 11. Therefore, to the collar 66 is constantly applied pressure by the elastic member 68, so that the collar 66 is always pressed to contact the tapered surface of the tapered shaft 62. The male screw 62b, the nut 65, the washer 67 and the elastic member 68 form the pressing member of the shaft and bush device 60. The degree of the pressure of the pressing member is such that the pin 62 is smoothly rotated without any backlash.

The operation of the present embodiment is explained as follows.

When the steering wheel 100 is to be moved as designated with broken line 100' or 100" shown in FIG. 10, the switch (not shown) of the driving source B is turned ON, whereby the rotational motion of the driving source B is transmitted to the spring couplar D through the reduction gear mechanism C'. Thus the link 64 is moved in either direction a or b in a low speed mode, so that this motion is transmitted to the upper bracket 55 and the bracket 55 is rotated around the center O (tilting center) to cause the desired tilt angle.

Between the pin 62 fixed to the upper bracket 55 and the link 64, relative rotation occurs during tilting operation. However, no backlash is caused at this portion, owing to the aforesaid pressing effect of the pressing members of the shaft and bush device 60 shown in FIG. 11.

In the case that abrasion is caused to the relative sliding surfaces of the shaft and bush device 60 during quite long use, the collar 66 is slightly biased to the tapered contact portion 62a of the pin 62, which diminishes the abrasion.

FIG. 13 and FIG. 14 show another shaft and bush device 660 which is a variation of the shaft and bush device 60 shown in FIGS. 11, 12. In these figures, the same parts are designated by the same numerals.

The bearing 660 is composed of a pin 620 fixed to an upper bracket 55, a collar 660 disposed at the outer circumference to the shaft 620a of the pin 620 and an elastic member 68 which is in contact with the outer end surface of the collar 660 and a nut 65 and wsher 67 which press the elastic member 68 towards the collar 660.

This variation differs from the aforesaid device 60 in that: a taper 660b is formed at the outer circumference of the collar 660 with a slit 660a and a ditch 660c, thereby in contact with a tapered hole 64a of a link 64, wherein the taper is bent in an opposite manner to that of the earlier embodiment.

The direction of applying pressure by the pressing member is similar to that of the device 60. The pressure member of this variation is composed of the male screw 620b at the top end of the pin 62, the nut 65, the washer 67 and the elastic member 68. The elastic member 68 is thick enough so that there is constantly an opening space (clearance) t3 between the end surface of the collar 660 and the one side surface of the upper bracket 55, and is always an opening space (clearance) t4 between the shoulder of the shaft 620a of the pin 620 and the washer 67.

The operation of the above explained variation is similar to that of the embodiment.

Obviously, numerous modifications and variations of the present invention are possible in light of the above teachings. It is therefore to be understood that within the scope of the appended claims, the invention may be practiced otherwise than as specifically described herein.

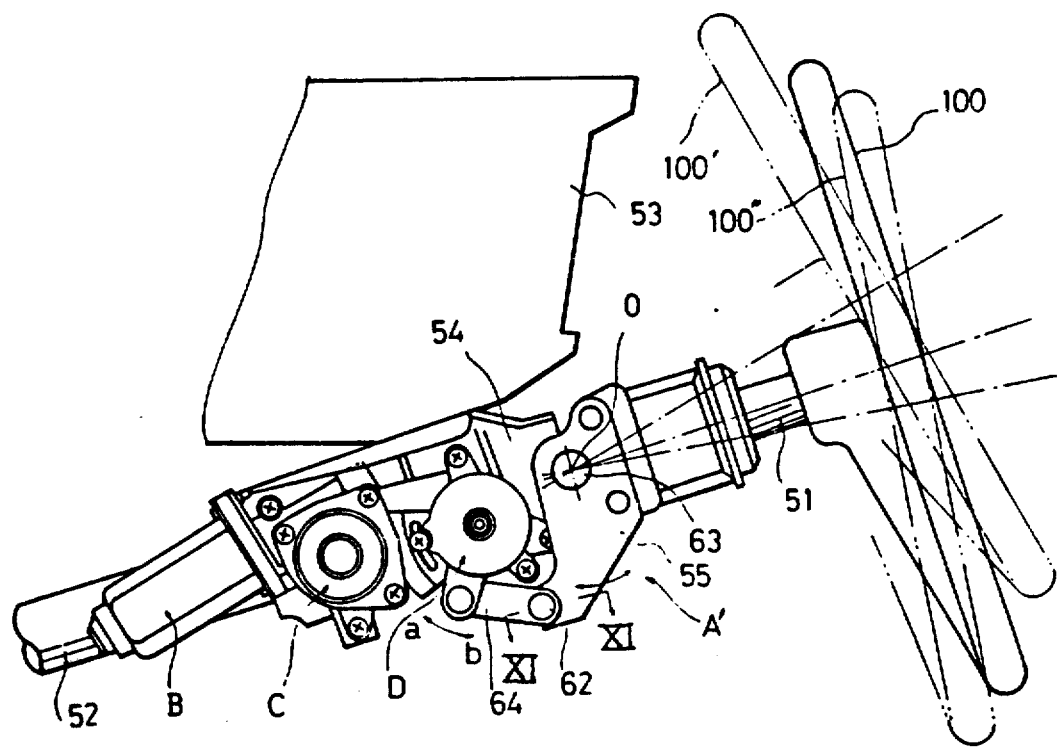

What is claimed as new and desired to be secured by Letters Patent of the United States is:

1. A shaft and bush device, comprising:
   a bush with an engaging hole supported on a base and a shaft being at least rotatably inserted into said engaging hole of the bush, wherein said bush has at least one slit axially formed therein to dimensionally change radially; and
   pressing means for forcing said bush to dimensionally change radially and to be pressed toward the shaft for diminishing backlash between the shaft and bush wherein said bush is divided axially into at least two parts and the at least one slit is formed between divided surfaces of said parts, wherein the pressing means is provided at an outer periphery of said bush for pressing said bush inwardly, and wherein the pressing means includes an elastic member covering the outer periphery of the bush and a rigid member covering the outer periphery of the elastic member.

2. A shaft and bush device according to claim 1, wherein the bush includes female threads at an inner surface and the shaft further comprises a screw shaft having male threads at its outer surface which engage the female threads of said bush.

3. A tilting steering equipment assembly, comprising:
   a main bracket fixed to a vehicle body, an upper bracket pivoted to said main bracket, an upper steering shaft rotatably supported on said upper bracket, a steering wheel connected to a top end of said upper shaft and an expansion device including a threaded screw shaft and threaded nut means disposed between said main bracket and said upper bracket, wherein said nut means has at least one axial slit formed therein so as to dimensionally change radially, and said expansion device further comprises pressing means for forcing said nut means to dimensionally change radially and to be pressed toward the shaft for diminishing backlash between said screw shaft and said nut means and wherein the pressing means further comprises an elastic member covering the outer periphery of the nut means and a rigid member covering the outer periphery of the elastic member.

4. A tilting steering equipment according to claim 3, wherein the nut means has at least one slit formed therein and the pressing means is provided at an outer periphery of said nut means for pressing said nut means inwardly.

5. A tilting steering equipment comprising a main bracket to be fixed to a vehicle body, an upper bracket pivoted to said main bracket, an upper steering shaft rotatably supported on said upper bracket, a steering wheel connected to the top end of said upper shaft, a link mechanism disposed between said main bracket and said upper bracket and including a shaft and a bush wherein said bush has at least one slit axially formed therein to dimensionally change radially and is provided with pressing means which forces said bush to dimensionally change radially and to be pressed toward the shaft for diminishing backlash between the shaft and bush and wherein the pressing means further comprises an elastic member covering the outer periphery of the bush and a rigid member covering the outer periphery of the elastic member.

* * * * *

UNITED STATES PATENT AND TRADEMARK OFFICE
CERTIFICATE OF CORRECTION

PATENT NO. : 4,633,732            Page 1 of 5

DATED : January 6, 1987

INVENTOR(S) : NISHIKAWA ET AL

It is certified that error appears in the above-identified patent and that said Letters Patent is hereby corrected as shown below:

Please substitute the attached Figures 1, and 7-10 for the originally filed drawings.

Signed and Sealed this

Twenty-second Day of September, 1987

Attest:

DONALD J. QUIGG

Attesting Officer        Commissioner of Patents and Trademarks

UNITED STATES PATENT AND TRADEMARK OFFICE
CERTIFICATE OF CORRECTION

PATENT NO. : 4,633,732

DATED : January 6, 1987

INVENTOR(S) : NISHIKAWA ET AL

It is certified that error appears in the above-identified patent and that said Letters Patent is hereby corrected as shown below:

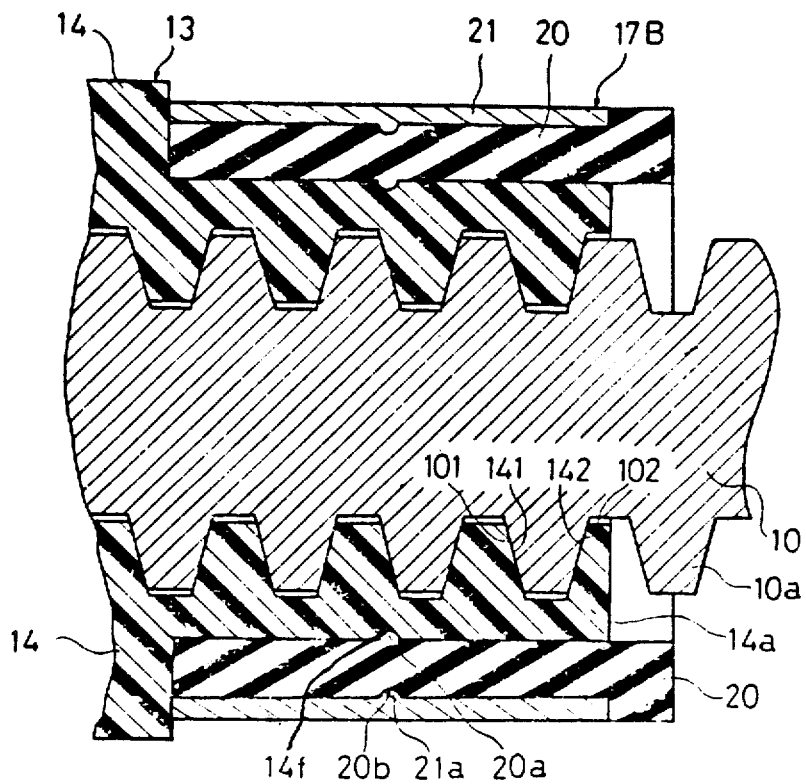

FIG.1

UNITED STATES PATENT AND TRADEMARK OFFICE
CERTIFICATE OF CORRECTION

PATENT NO. : 4,633,732  Page 3 of 5
DATED : January 6, 1987
INVENTOR(S) : NISHIKAWA ET AL It is certified that error appears in the above-identified patent and that said Letters Patent is hereby corrected as shown below:

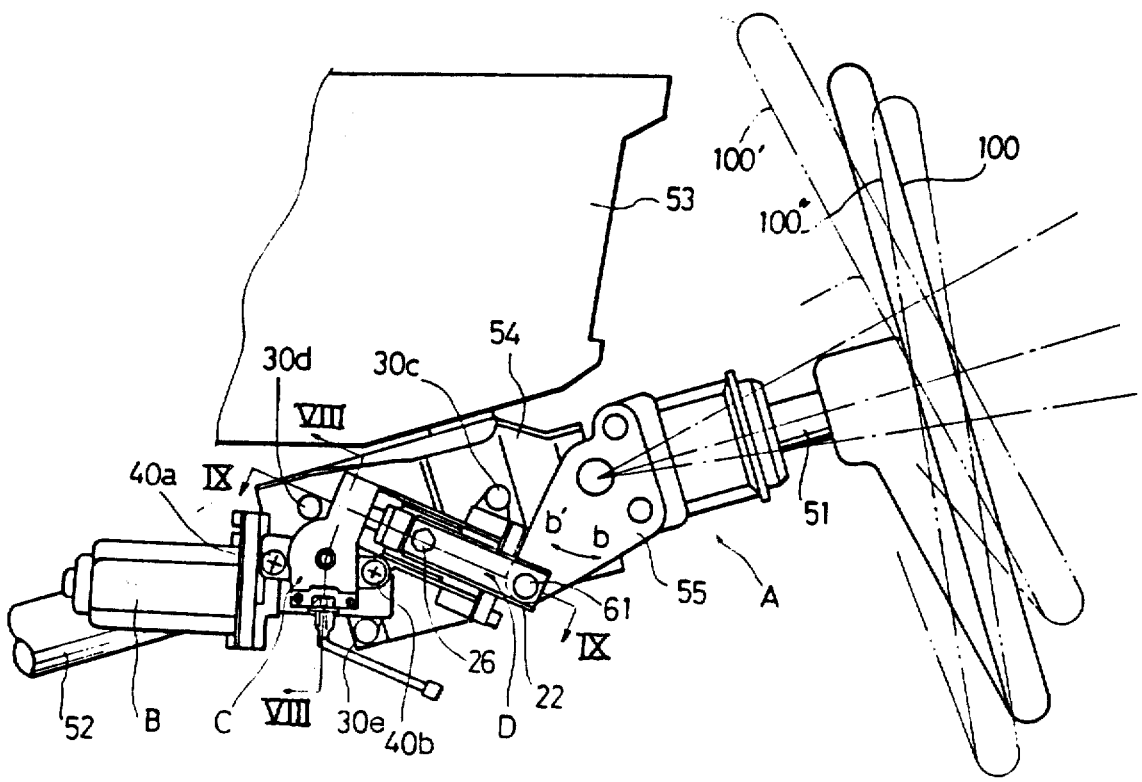

FIG. 7

UNITED STATES PATENT AND TRADEMARK OFFICE
CERTIFICATE OF CORRECTION

PATENT NO. : 4,633,732  Page 4 of 5
DATED : January 6, 1987
INVENTOR(S) : NISHIKAWA ET AL It is certified that error appears in the above-identified patent and that said Letters Patent is hereby corrected as shown below:

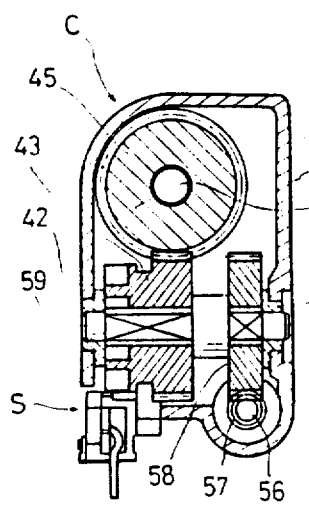

FIG. 8

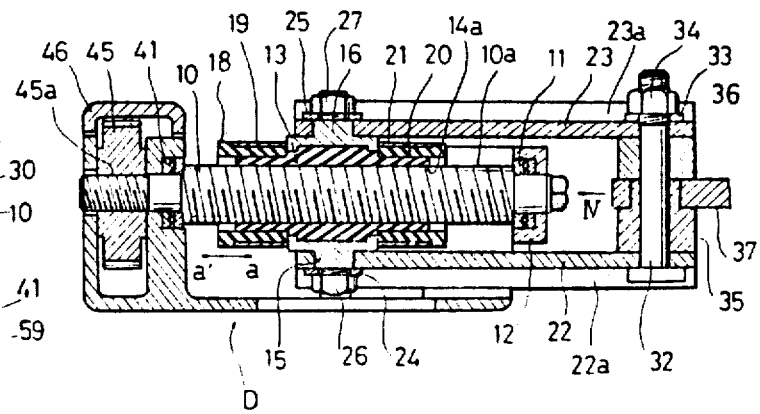

FIG. 9

UNITED STATES PATENT AND TRADEMARK OFFICE
CERTIFICATE OF CORRECTION

PATENT NO. : 4,633,732
DATED : January 6, 1987
INVENTOR(S) : NISHIKAWA ET AL

It is certified that error appears in the above-identified patent and that said Letters Patent is hereby corrected as shown below:

FIG. 10